United States Patent
Goupil (10) Patent No.: US 11,623,732 B2
(45) Date of Patent: Apr. 11, 2023

(54) ASSEMBLY FOR AIRCRAFT COMPRISING AN IMPROVED AIR SEAL SYSTEM BETWEEN A VENTRAL FAIRING AND A WING

(71) Applicant: Airbus Operations (S.A.S.), Toulouse (FR)

(72) Inventor: Frédéric Goupil, Toulouse (FR)

(73) Assignee: Airbus Operations (S.A.S.), Toulouse (FR)

( * ) Notice: Subject to any disclaimer, the term of this patent is extended or adjusted under 35 U.S.C. 154(b) by 135 days.

(21) Appl. No.: 17/155,583

(22) Filed: Jan. 22, 2021

(65) Prior Publication Data
US 2021/0229795 A1 Jul. 29, 2021

(30) Foreign Application Priority Data
Jan. 23, 2020 (FR) .................................. 2000659

(51) Int. Cl.
*B64C 7/00* (2006.01)
*B64C 1/14* (2006.01)

(52) U.S. Cl.
CPC . *B64C 7/00* (2013.01); *B64C 1/14* (2013.01)

(58) Field of Classification Search
CPC .............. B64C 7/00; B64C 1/14; B64C 25/16
See application file for complete search history.

(56) References Cited

U.S. PATENT DOCUMENTS

| | | | |
|---|---|---|---|
| 4,312,153 A * | 1/1982 | Parkinson | B64C 1/14 49/40 |
| 4,861,823 A * | 8/1989 | Qureshi | C08G 73/0638 524/611 |
| 2003/0006344 A1 * | 1/2003 | Pauly | F16J 15/027 244/130 |
| 2003/0066933 A1 * | 4/2003 | Maury | F16J 15/027 244/130 |
| 2010/0243810 A1 | 9/2010 | Lobo Barros et al. | |
| 2014/0345199 A1 * | 11/2014 | Yahata | B64C 1/14 49/475.1 |
| 2015/0344122 A1 * | 12/2015 | Paul | E06B 7/2303 244/129.5 |

(Continued)

FOREIGN PATENT DOCUMENTS

| | | |
|---|---|---|
| FR | 2 789 144 A1 | 8/2000 |
| FR | 2 827 029 A1 | 1/2003 |
| FR | 2 936 489 A1 | 4/2010 |

OTHER PUBLICATIONS

French Search Report for Application No. 2000659 dated Oct. 8, 2020.

*Primary Examiner* — Rodney A Bonnette
(74) *Attorney, Agent, or Firm* — KDW Firm PLLC (57) ABSTRACT

To improve the seal between a wing and a ventral fairing of an aircraft, an assembly includes an air seal system arranged in an opening, between the ventral fairing and the wing. The seal system includes a sealing blade, a first end of which presses against the wing, and a connecting device, on the ventral fairing, for a second blade end that is opposite the first end. The connecting device includes at least one first connecting layer, of which a first connecting face is secured to a first surface of the sealing blade, and of which a second face, opposite the first face, is secured to the ventral fairing, the first connecting layer being made of a material including an elastomer.

20 Claims, 7 Drawing Sheets

(56) References Cited

U.S. PATENT DOCUMENTS

| | | |
|---|---|---|
| 2016/0023745 A1 | 1/2016 | Tiryaki et al. |
| 2017/0274977 A1* | 9/2017 | Zhang .................. B64C 9/08 |
| 2017/0313402 A1* | 11/2017 | Flores .................. H01Q 1/28 |
| 2021/0139139 A1* | 5/2021 | Schroeder ........... B64C 29/0033 |

* cited by examiner

ASSEMBLY FOR AIRCRAFT COMPRISING AN IMPROVED AIR SEAL SYSTEM BETWEEN A VENTRAL FAIRING AND A WING

CROSS-REFERENCE TO RELATED APPLICATION

This application claims priority to French patent application FR 2000659 filed Jan. 23, 2020, the entire disclosure of which is incorporated by reference herein.

TECHNICAL FIELD

The disclosure herein relates to the field of the air seal between an aircraft wing and a ventral fairing (or 'belly fairing').

An air seal system is generally installed between the wing and the ventral fairing of the aircraft, in an opening defined through this fairing, and through which the proximal end of the wing passes. The main purpose of this seal system is to limit the aerodynamic disturbances at the join between the wing and the ventral fairing, by providing a smooth transition between these two elements.

The disclosure herein relates more preferably to commercial airplanes.

BACKGROUND

A seal system of this kind usually comprises a seal, of which one end is fastened to the ventral fairing, and of which a lip, forming the opposite end of the seal, is arranged so as to press against the wing.

The lip must have sufficient elasticity to allow relative displacements between the wing and the ventral fairing, in a general direction of relative displacement that can be considered the same as the vertical direction of the aircraft. Indeed, the seal system must remain effective whatever the position of the wing with respect to the ventral fairing, it being possible for this relative position to vary during flight, essentially owing to the deformation of the wing.

Moreover, the lip must have sufficient stiffness to withstand the difference in air pressure observed between one side of this lip and the other. The difference in pressure is essentially a result of the high speed of the air flowing around the outer side of this lip. The force resulting from the pressure difference, for its part, is oriented in a direction orthogonal to the lip, which is close to or can be considered the same as a transverse direction of the aircraft. When the stiffness of the lip is not sufficient to withstand the difference in pressure, this lip vibrates and generates significant noise, while also generating non-negligible aerodynamic disturbances at the join between the wing and the ventral fairing.

Multiple shape optimizations have been proposed for the lip of the seal system, but none of these makes it possible to entirely satisfactorily meet the two opposing constraints presented above, in terms of elasticity and stiffness.

SUMMARY

To remedy the abovementioned drawback, the disclosure herein relates first of all to an assembly for an aircraft comprising a wing, a ventral fairing comprising an opening through which one end of the wing passes, and an air seal system arranged in the opening, between the ventral fairing and the wing. According to the disclosure herein, the seal system comprises:

a sealing blade, a first end of which presses against the wing; and a connecting device, on the ventral fairing, for a second blade end that is opposite the first end, the connecting device comprising at least one first connecting layer, of which a first connecting face is secured to a first surface of the sealing blade, and of which a second face, opposite the first face, is secured to the ventral fairing, the first connecting layer being made of a material comprising an elastomer.

Thus, the disclosure herein breaks with the technology of seal systems having a deformable contact lip. It provides a first connecting layer made of a material comprising an elastomer, the intrinsic properties of which are advantageously utilized to arrive at the desired compromise in terms of stiffness and elasticity. Indeed, a layer made of a material of this kind makes it possible to obtain high stiffness in compression and relative flexibility in shear. This difference in stiffness in two different directions proves to be entirely suitable for, on the one hand, in the shear direction, allowing the relative displacements between the wing and the ventral fairing while maintaining the contact between the sealing blade and the wing, and, on the other hand, in the compression direction, resisting the difference in air pressure observed between one side of this blade and the other. The latter may thus have high stiffness and itself withstand the abovementioned pressure difference, which is not the case for the deformable contact lips used in the prior art. In other words, the disclosure herein provides that the sealing blade should move rather than deform.

Because of this principle, the solution proposed by the disclosure herein proves to be particularly simple to implement, while offering the opposing properties required to ensure high levels of aerodynamic performance of the aircraft.

The disclosure herein preferably provides at least one of the following optional features, taken in isolation or in combination.

Preferably, the first connecting layer is made of a material comprising only elastomer, or of a material comprising a mixture of elastomer elements and additional elements, preferably metallic or composite elements.

Preferably, the sealing blade is made of a metallic or composite material.

Preferably, the first connecting layer is continuous along the first surface of the sealing blade, or multiple first connecting layers are in succession along the first surface of the sealing blade, being spaced apart from one another.

Preferably, the connecting device comprises at least one second connecting layer, of which a first connecting face is secured to a second surface of the sealing blade opposite the first surface, and of which a second face, opposite the first face, is secured to the ventral fairing, the second connecting layer being made of a material comprising an elastomer, preferably in a different material from that of the first connecting layer.

Preferably, the connecting device comprises a support having a generally U-shaped section, of which the two legs of the U each have an inner surface that is respectively fastened, preferably adhesively, to the second face of the first and second connecting layers, such that the assemblage formed by the second end of the blade, equipped with the first and second connecting layers, is tightly enclosed between the two legs of the U.

Preferably, the support is fastened to the ventral fairing via the intermediary of one of the legs of the U, an outer surface of which is clamped against this ventral fairing.

Preferably, the connecting device comprises fastening elements for fastening the support to the ventral fairing, each fastening element passing through the ventral fairing, the two legs of the U and a passage hole through the sealing blade, the passage hole having a shape that is elongate in a general direction of relative displacement between the ventral fairing and the wing.

Preferably, each fastening element also passes through a passage hole through each of the first and second connecting layers, each of these passage holes preferably having a shape that is elongate in the general direction of relative displacement between the ventral fairing and the wing.

Preferably, the fastening elements are bolts.

Preferably, the first end of the blade, bearing against the wing, has an anti-friction coating, or an anti-friction part, and/or the end of the blade bears a thin layer of elastomer.

Preferably, each first connecting layer has a Young modulus in compression K1 and a shear modulus K2, the ratio of K1 to K2 being greater than 5.

Preferably, the air seal system is continuous all around the wing.

Alternatively, multiple air seal systems are arranged so as to be adjacent all around the wing.

The disclosure herein also relates to an aircraft comprising such an assembly.

Further advantages and features of the disclosure herein will become apparent from the following non-limiting detailed description.

BRIEF DESCRIPTION OF THE DRAWINGS

This description will be provided with reference to the appended drawings, in which.

DETAILED DESCRIPTION

Figure 1:
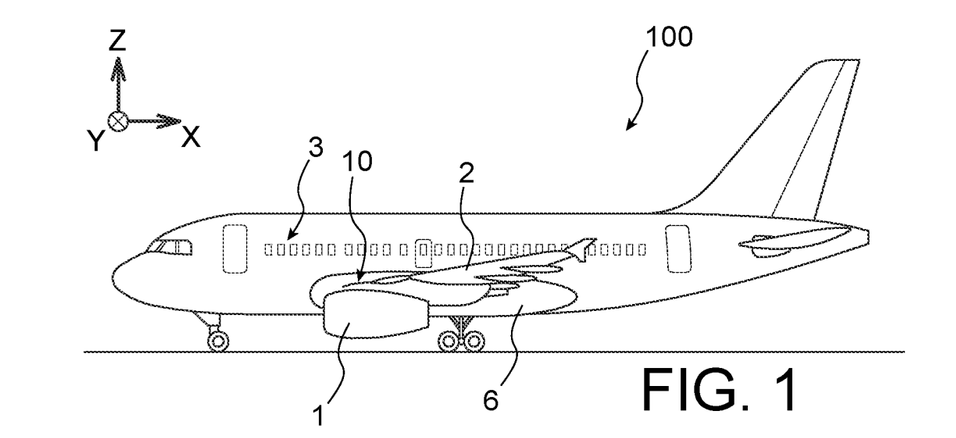
FIG. 1 depicts a plan side view of an aircraft.
Figure 2:
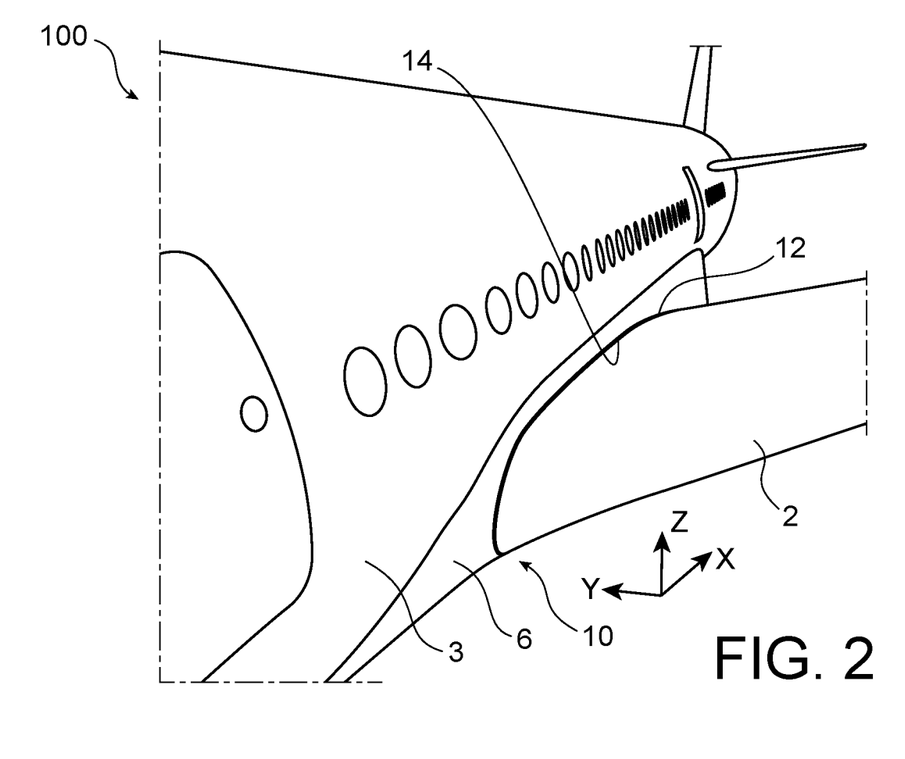
FIG. 2 depicts a perspective view of a part of the aircraft shown in the preceding figure, this figure showing in particular an assembly according to the disclosure herein, comprising a ventral fairing, a wing, and an air seal system arranged between these two elements.
Figure 3:
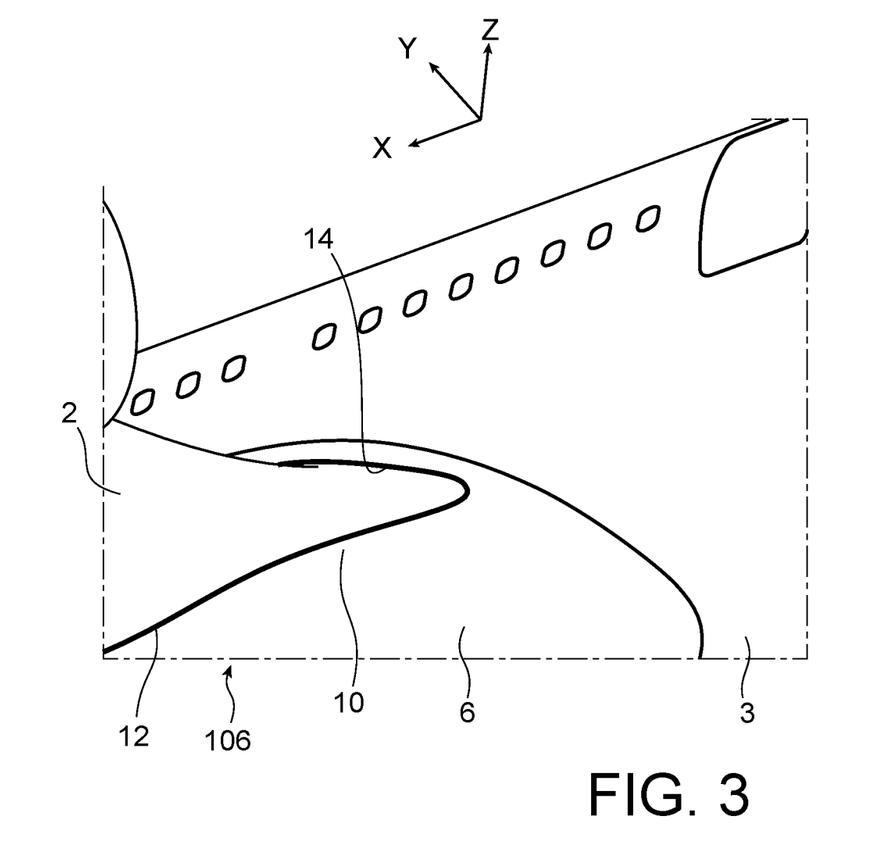
FIG. 3 depicts a perspective view of the assembly shown in the preceding figure, from a different viewing angle.

FIGS. 1 to 3 show an aircraft 100 of the commercial airplane type, comprising two wings 2 (only one of which is visible in FIG. 1) fastened to a fuselage 3, and each supporting a turbomachine 1, such as a jet engine. Shown on this aircraft 100 is a ventral fairing 6, arranged beneath a central part of the fuselage 3, and fastened to this same part.

The disclosure herein relates to an assembly 10 comprising the ventral fairing 6, one of the wings 2, and an air seal system 12 that is specific to the disclosure herein, this being arranged in an opening 14 of the ventral fairing 6, between the wing 2 and the fairing 6. The opening 14 created through the ventral fairing 6 has passing through it a proximal end of the wing, which is of matching shape.

It is noted that, as is conventional, the ventral fairing 6 has two transversely opposite openings 14 (only one opening 14 being visible in each of FIGS. 1 to 3). Consequently, the assembly 10 according to the disclosure herein could relate to both wings 2 and their joins to the ventral fairing 6, even if in the following description only one of these two joins will be explored. The other join may of course be of an identical design to that which will be described below, with reference to the three mutually orthogonal directions X, Y and Z. The X direction is the longitudinal direction of the aircraft, and it also corresponds to the longitudinal direction of the assembly 10. The Y direction is the transverse direction of the aircraft, also known as the lateral direction. It also corresponds to the transverse direction of the assembly 10 according to the disclosure herein. Finally, the Z direction corresponds to the height direction of the aircraft and of its assembly 10.

Figure 4:
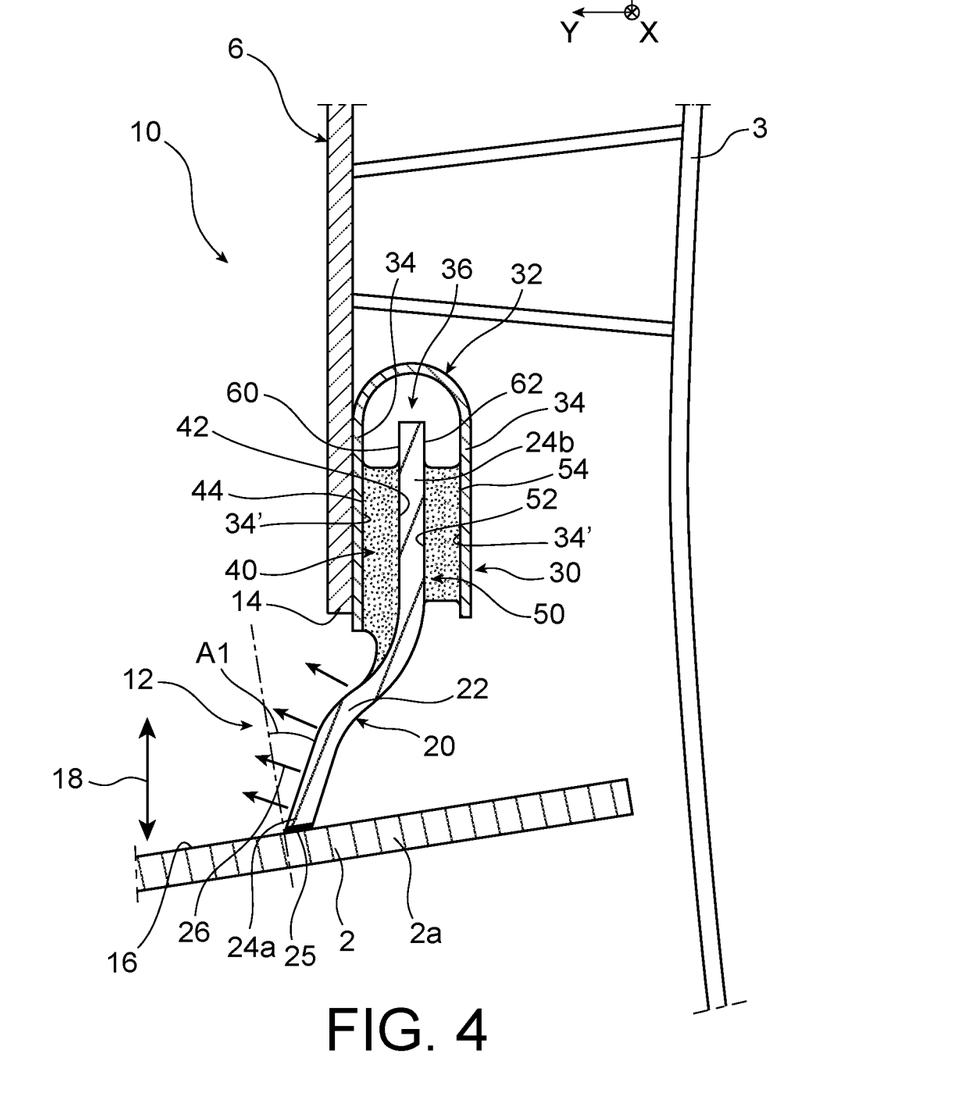
FIG. 4 depicts a view in transverse section of the assembly shown in FIGS. 2 and 3, with the assembly being in a nominal configuration.

FIG. 4 shows in greater detail the assembly 10 that is specific to the disclosure herein. The assembly 10 comprises, first of all, the ventral fairing 6, which is fixedly attached to the fuselage 3. Indeed, its lateral opening 14 has passing through it a proximal end 2a of the wing 2, such that an aerodynamic outer surface 16 of the wing is positioned facing the contour of the opening 14. A clearance is provided between this contour and the wing 2, so as to allow the relative displacements between this wing 2 and the fairing 6. These relative displacements correspond to movements of the proximal end 2a of the wing 2 within the opening 14, in a general direction 18 of relative displacements between these two elements, which direction can be considered the same as the Z direction.

In order to fill the abovementioned clearance between the proximal end 2a of the wing 2 and the ventral fairing 6, the assembly 10 therefore comprises the air seal system 12, arranged in the opening 14. In that respect, it is noted that the seal system 12 may be continuous all around the wing, along the closed contour of the opening 14. Alternatively, multiple adjacent seal systems 12 may be arranged in succession all around the wing, so that the embodiment is segmented along the closed contour of the opening 14.

The air seal system 12 has a multiple-component design. First of all, it comprises a sealing blade 20, which is not necessarily planar. It has for example two opposite planar parts that are separated by a central part 22 having one or more curvatures. More generally, this blade 20 is rigid and is intended to not deform, or to deform only very slightly. To that end, it is made of a metallic material or of a composite material comprising a matrix and a filler, for example one based on glass fibers and/or carbon fibers.

The blade 20 is thin and of constant or essentially constant thickness, for example less than 5 mm. Its first end 24a presses against the aerodynamic outer surface 16 of the wing, preferably via an anti-friction coating 25, or via an anti-friction part fitted to this first end 24a of the blade 20. The coating 25 or the anti-friction part is made of a different material from that of the blade, for example one based on polytetrafluoroethylene (PTFE), or on another material having similar anti-friction properties. One variant may consist in providing the end 24a of the blade 20 with a thin layer of elastomer, which adheres to the blade 20. This layer may for example have a thickness of less than 5 mm, in order to conform as well as possible to any flatness defects of the aerodynamic outer surface 16 of the wing, and thus provide a better seal. In this variant, the anti-friction coating would possibly be added to the end of the elastomer layer in order to be in contact with the aerodynamic outer surface 16 of the wing.

The planar first end 24a of the blade 20 forms locally, with the normal to the aerodynamic outer surface 16 of the wing, an acute angle A1 between 0 and 45°, and more preferably between 10 and 30°.

It is this blade part including the first end 24a that is arranged in the opening 14, to fill the clearance between the opening contour and the aerodynamic outer surface 16 of the wing. By virtue of the intrinsic stiffness of the blade 20, the blade proves to be entirely capable of withstanding the difference in air pressure observed between one side of this lip and the other, this difference being depicted schematically by the arrows 26 in FIG. 4. This difference in pressure is a result of the high speed of the air flowing around the outer side of this lip, compared to the stagnant or essentially stagnant air on the inner side, close to the fuselage 3. The force resulting from the pressure difference, for its part, is oriented in a direction orthogonal to the blade 20, which is slightly inclined relative to the transverse direction Y. By virtue of the stiffness of the blade 20, which is sufficient to withstand the difference in pressure, this blade 20 does not vibrate and therefore does not generate any noise or any aerodynamic disturbances at the join between the wing 2 and the ventral fairing 6.

At its second end 24b, which is opposite the first end 24a in the Z direction, the blade 20 cooperates with a connecting device 30 that is an integral part of the seal system 12. The connecting device 30 makes it possible to connect this second end 24b to the ventral fairing 6 close to the opening 14. First of all, the connecting device 30 comprises a support 32 having a generally U-shaped section, which is open in the direction of the aerodynamic outer surface 16 of the wing. The two legs 34 of the U each have an inner surface 34', which face one another. Between these, there is provided an assemblage 36 formed by the second end 24b of the blade, equipped on either side of the latter with a first connecting layer 40 and with a second connecting layer 50. The two layers 40, 50 are also integral parts of the connecting device 30.

More precisely, the assemblage 36, corresponding to the second end 24b that is sandwiched between the two connecting layers 40, 50, is itself tightly enclosed between the two legs 34 of the U. To that end, the first connecting layer 40 has a first connecting face 42 that is secured to a first surface 60 of the blade 20, and a second connecting face 44, opposite the first, that is secured to the inner surface 34' of the leg 34 of the U that is clamped against the inner surface of the ventral fairing 6. Similarly, the second connecting layer 50 has a first connecting face 52 that is secured to a second surface 62 of the blade 20, opposite the first surface 60, and a second connecting face 54, opposite the first, that is secured to the inner surface 34' of the other leg 34 of the U that is arranged at a distance from the ventral fairing 6.

Preferably, the faces 42, 44, 52, 54 of the layers 40, 50 are adhesively fastened to their respective surfaces. Furthermore, one of the characteristics of the disclosure herein resides in the fact that the connecting layers 40, 50 are each made of a material comprising an elastomer, and are for example made of the same material.

Figure 10:
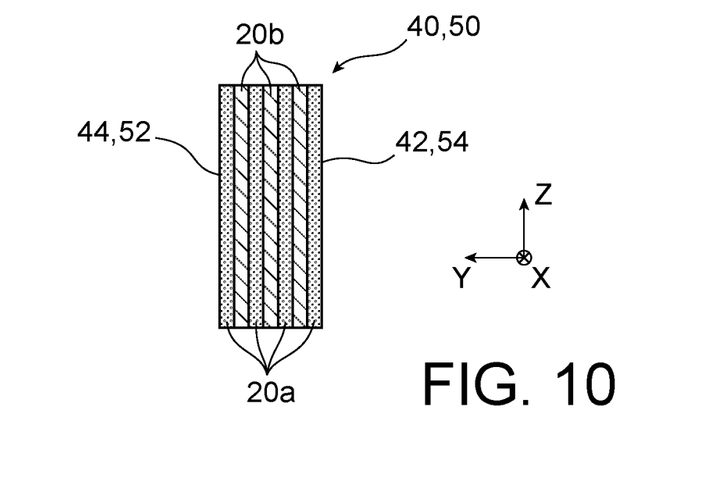
FIG. 10 depicts a view in section of a connecting layer fitted to the assembly shown in FIGS. 2 to 9, the connecting layer being in the form of an alternative embodiment.

This material may comprise only elastomer, as depicted schematically in FIG. 4, or it may comprise a mixture of elastomer elements 20a and additional elements 20b, preferably metallic or composite elements, as depicted schematically in FIG. 10. In this latter embodiment, the elements 20a, 20b in the form of sublayers are stacked in the Y direction, corresponding to the direction of the thickness of the connecting layers 40, 50, and also to the direction of stacking of the elements 6, 34, 40, 24b, 50, 34 of the air seal system 12.

According to one variant, the layers 40 and 50 are different since the layer 40 preferably establishes a seal with respect to air between the blade 20 and the leg 34 of the U whose outer surface is clamped against the inner surface of the fairing 6. Thus, the layer 40 is preferably continuous all along the blade 20. The other layer 50, for its part, does not necessarily serve for sealing with respect to air, and it can thus be solely provided for balancing forces, and provide better guiding/holding of the blade 20. It also makes it possible to potentially generate a preload at installation. For example, the U-shaped support 32 could be slightly opened prior to integration of the rigid blade 20 and its connecting layers 40, 50. Then, upon tightening in the stacking direction, a compressive preload would be generated. This would have the effect of increasing the ratio of the stiffnesses K2/K1, described below, but also of improving the fatigue life of the connecting layers 40, 50.

The thickness of each connecting layer 40, 50 is constant or essentially constant, for example of the order of 4 to 20 mm. By virtue of the specific material used for each connecting layer 40, 50, this layer has high resistance to compression in the Y direction while providing flexibility in shear in the direction 18, parallel to which the part of the blade 20 which includes the second end 24b extends. These features are advantageously utilized to arrive at the sought-after compromise in terms of stiffness and elasticity. Indeed, the difference in stiffness in the two different directions Y and Z proves to be entirely suitable for, on the one hand, in the shear direction Z, allowing the relative displacements between the wing 2 and the ventral fairing 6 while maintaining the contact between the sealing blade 20 and the wing 2, and, on the other hand, in the compression direction Y, resisting the difference in air pressure observed between one side of this blade 20 and the other. In other words, the principle of the disclosure herein is based on a displacement of the sealing blade 20 in the direction 18 so as to adapt to the relative displacements between the wing 2 and the ventral fairing 6, rather than this same blade deforming under stress.

In order to strengthen this principle that combines both flexibility and stiffness, is preferably provided that each connecting layer 40, 50 has a compression modulus K1 and a shear modulus K2, and that the ratio of K1 to K2 is greater than 5. In that respect, it is noted that the values K1 and K2 correspond to values obtained according to conventional techniques for determining moduli.

Figure 5:
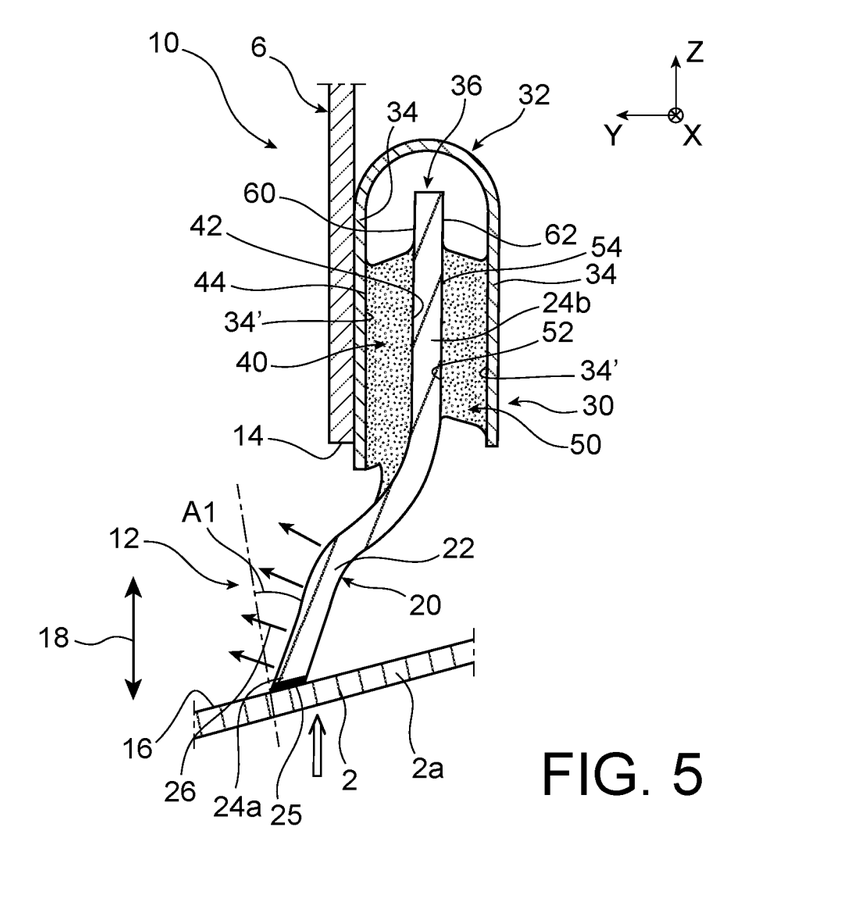
FIG. 5 depicts a view in transverse section similar to that of FIG. 4, with the assembly being in a deformed configuration.

FIG. 4, which has just been described, corresponds to a nominal configuration of the assembly 10, in which the proximal end 2a of the wing 2 is centered or essentially centered in its opening 14 of the ventral fairing 6. FIG. 5, for its part, depicts a deformed configuration of this same assembly 10, in which the wing 2 is closer to the contour of the opening 14. This leads the blade 20 to move in the direction 18, by shear deformation of the connecting layers 40, 50. As is shown in FIG. 5, the part of the blade 20 which includes the second end 24b moves in the direction 18 inside the U-shaped support 32 owing to the shear deformation of the layers 40, 50.

To complete the connecting device 30, this device comprises elements for fastening the support 32 to the ventral fairing 6, close to the contour of the opening 14. Such fastening elements 64 are shown in FIGS. 6 to 9. They are preferably in the form of bolts 64, which might pass through spacers 66. Each bolt 64 is preferably oriented in the Y direction, passing in succession through the ventral fairing 6, one of the two legs 34 of the U, whose outer surface is clamped against the inner surface of the fairing 6, the sealing blade 20, and the other of the two legs 34 of the U.

Figure 6:
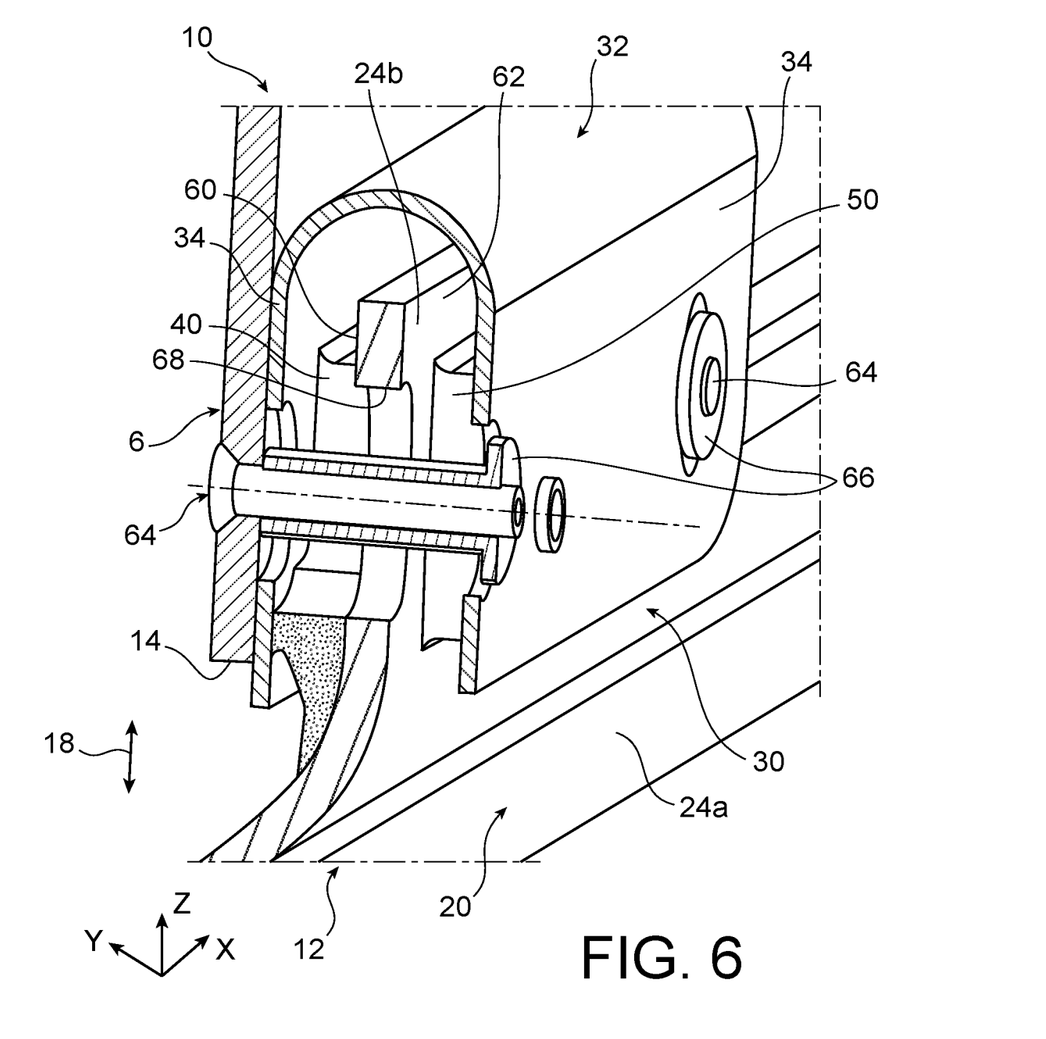
FIG. 6 depicts a perspective view of a portion of the assembly shown in FIGS. 2 to 5.
Figure 7:
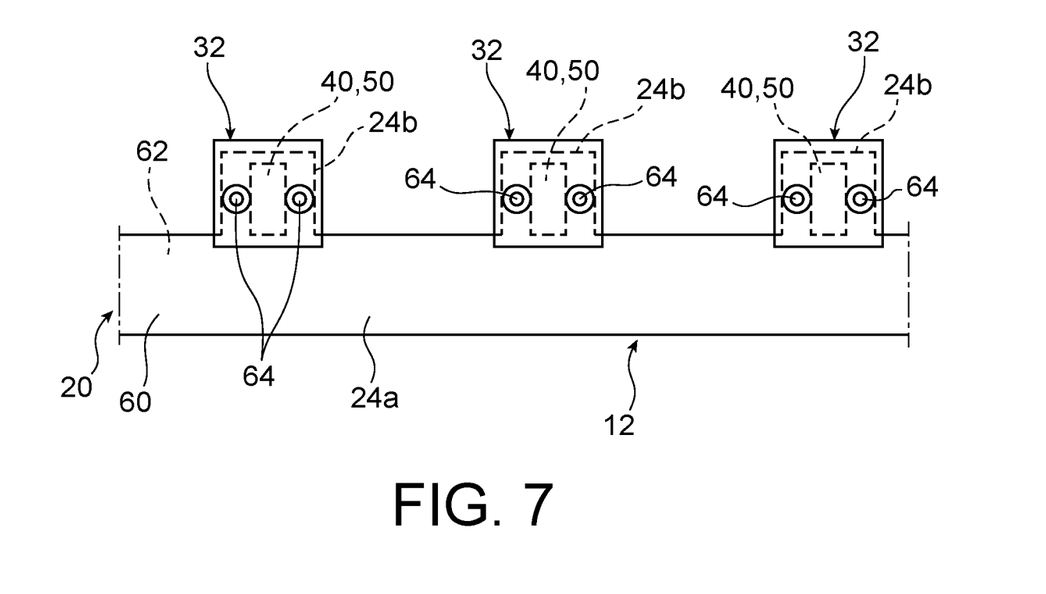
FIG. 7 depicts a side view of the seal system shown in FIGS. 2 to 6, in a first embodiment.

In the embodiment shown in FIGS. 6 and 7, each bolt 64 passes through a passage hole 68 created through the second end 24b of the sealing blade. These passage holes 68 have a shape that is elongate in the general direction 18 of relative displacement between the ventral fairing 6 and the wing 2, so as not to hamper the displacements of the latter in the opening 14 of the fairing 6. This is the same for passage holes 69 for the bolts 64 through the two legs 34 of the U-shaped support 32, these holes 69 indeed being elongate in the direction 18. However, since the support 32 is intended to remain fixed relative to the bolts 64, such an elongation of the passage holes 69 in the direction 18 proves necessary only in order to permit initial adjustment of the device in the direction 18, prior to tightening thereof on the fairing 6, this being done for example in order to account for manufacturing and assembly tolerances between the fairing 6 and the aerodynamic outer surface 16 of the wing.

Here, the second end 24b of the blade 20 is discontinuous, so as to form multiple teeth/notches which are shown in FIG. 7. A support 32 is then associated with each one of these teeth 24b, and bolts 64 are located on either side of the connecting layers 40, 50, without passing through them. Thus, in this embodiment, there is a succession, along the first surface 60 of the blade 20, of multiple first connecting layers 40, these being spaced apart from one another, and a succession, along the second surface 62 of the blade 20, of multiple second connecting layers 50, these also being spaced apart from one another and in opposing pairs with the first layers 40.

Figure 8:
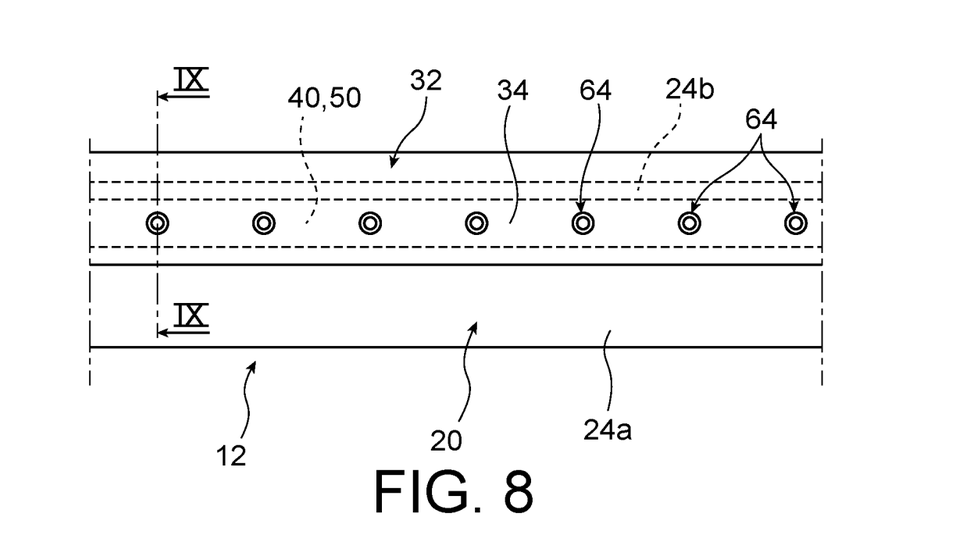
FIG. 8 depicts a side view in section similar to that of FIG. 7, with the seal system being in a second embodiment.
Figure 9:
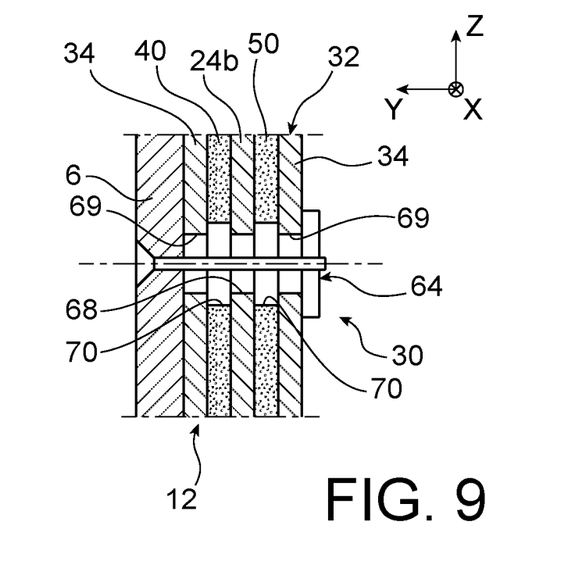
FIG. 9 depicts a view in section of a portion of the assembly, considered along the line IX-IX of FIG. 8.

According to one alternative embodiment, shown in FIGS. 8 and 9, the first and second connecting layers 40, 50 are each continuous along their respective surfaces 60, 62 of the blade 20, having a length that is identical or essentially identical to that of this same blade. In this alternative, passage holes 70 for the bolts 64 are provided through each one of the layers 40, 50, it being possible for these holes 70 to also have a shape that is elongate in the direction 18.

Of course, various modifications can be made by a person skilled in the art to the disclosure herein which has just been described, purely by way of non-limiting examples, and within the limits of the scope of the appended claims.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An assembly for an aircraft comprising a wing, a ventral fairing comprising an opening through which one end of the wing passes, and an air seal system in the opening, between the ventral fairing and the wing, the seal system comprising:
   a sealing blade, a first end of which presses against the wing; and
   a connecting device that comprises:
      a support configured for rigid attachment on an inner surface of the ventral fairing and that is configured to receive therein a second end of the sealing blade, the second end of the sealing blade being opposite the first end of the sealing blade; and
      at least one first connecting layer within the support, wherein:
         a first connecting face of the at least one first connecting layer is secured to a first surface of the sealing blade;
         a second face of the at least one first connecting layer is secured to the ventral fairing;
         the second face of the at least one first connecting layer is opposite the first face of the at least one first connecting layer; and
         the first connecting layer is made of a material comprising an elastomer.

2. The assembly of claim 1, wherein the first connecting layer is made of a material comprising only elastomer, or of a material comprising a mixture of elastomer elements and additional metallic or composite elements.

3. The assembly of claim 1, wherein the sealing blade is made of a metallic or composite material.

4. The assembly of claim 1, wherein the first connecting layer is continuous along the first surface of the sealing blade, or multiple first connecting layers are in succession along the first surface of the sealing blade, being spaced apart from one another.

5. The assembly of claim 1, wherein the connecting device comprises at least one second connecting layer, of which a first connecting face is secured to a second surface of the sealing blade opposite the first surface, and of which a second face, opposite the first face, is secured to the ventral fairing, the second connecting layer being made of a material comprising an elastomer that is different from the elastomer from which the at least one first connecting layer is made.

6. The assembly of claim 5, wherein the support has a generally U-shaped section, of which two legs of the U-shaped section each have an inner surface that is respectively fastened to the second face of the first and second connecting layers, such that an assembly formed by the second end of the blade, equipped with the first and second connecting layers, is tightly enclosed between the two legs of the U-shaped section.

7. The assembly of claim 6, wherein the support is fastened to the ventral fairing via an intermediary of one of the legs of the U-shaped section, an outer surface of which is clamped against the ventral fairing.

8. The assembly of claim 7, wherein the connecting device comprises fastening elements for fastening the support to the ventral fairing, each fastening element passing through the ventral fairing, the two legs of the U and a passage hole through the sealing blade, the passage hole having a shape that is elongate in a general direction of relative displacement between the ventral fairing and the wing.

9. The assembly of claim 8, wherein each fastening element also passes through a passage hole through each of the first and second connecting layers, each of these passage holes having a shape that is elongate in a general direction of relative displacement between the ventral fairing and the wing.

10. The assembly of claim 8, wherein the fastening elements are bolts.

11. The assembly of claim 1, wherein the first end of the blade, bearing against the wing, has an anti-friction coating, or an anti-friction part, and/or wherein the first end of the blade bears a thin layer of elastomer.

12. The assembly of claim 1, wherein each first connecting layer has a compression modulus K1 and a shear modulus K2, and wherein a ratio of K1 to K2 is greater than 5.

13. The assembly of claim 1, wherein the air seal system is continuous all around the wing.

14. The assembly of claim 1, wherein multiple air seal systems are arranged adjacent all around the wing.

15. An aircraft comprising an assembly of claim 1.

16. An assembly for an aircraft comprising a wing, a ventral fairing comprising an opening through which one end of the wing passes, and an air seal system in the opening, between the ventral fairing and the wing, the seal system comprising:
a sealing blade, a first end of which presses against the wing; and
a connecting device that is provided on the ventral fairing for a second end of the sealing blade, the second end of the sealing blade being opposite the first end of the sealing blade, the connecting device comprising:
at least one first connecting layer, wherein:
a first connecting face of the at least one first connecting layer is secured to a first surface of the sealing blade;
a second face of the at least one first connecting layer is secured to the ventral fairing;
the second face of the at least one first connecting layer is opposite the first face of the at least one first connecting layer; and
the first connecting layer is made of a material comprising an elastomer; and
at least one second connecting layer, wherein:
a first connecting face of the at least one second connecting layer is secured to a second surface of the sealing blade, the second surface of the sealing blade being opposite the first surface of the sealing blade;
a second connecting face of the at least one second connecting layer is secured to the ventral fairing;
the second face of the at least one second connecting layer is opposite the first face of the at least one second connecting layer; and
the at least one second connecting layer is made of a material comprising an elastomer that is different from the elastomer from which the at least one first connecting layer is made.

17. The assembly of claim 16, wherein the connecting device comprises a support having a generally U-shaped section, of which two legs of the U-shaped section each have an inner surface that is respectively fastened to the second face of the first and second connecting layers, such that an assembly formed by the second end of the blade, equipped with the first and second connecting layers, is tightly enclosed between the two legs of the U-shaped section.

18. The assembly of claim 17, wherein the support is fastened to the ventral fairing via an intermediary of one of the legs of the U-shaped section, an outer surface of which is clamped against the ventral fairing.

19. The assembly of claim 18, wherein the connecting device comprises fastening elements for fastening the support to the ventral fairing, each fastening element passing through the ventral fairing, the two legs of the U and a passage hole through the sealing blade, the passage hole having a shape that is elongate in a general direction of relative displacement between the ventral fairing and the wing.

20. The assembly of claim 19, wherein:
each fastening element also passes through a passage hole through each of the first and second connecting layers, each of these passage holes having a shape that is elongate in a general direction of relative displacement between the ventral fairing and the wing; or
the fastening elements are bolts.

* * * * *